W. D. MORRIS.
VEHICLE WHEEL.
APPLICATION FILED JULY 17, 1912.
1,072,348.
Patented Sept. 2, 1913.
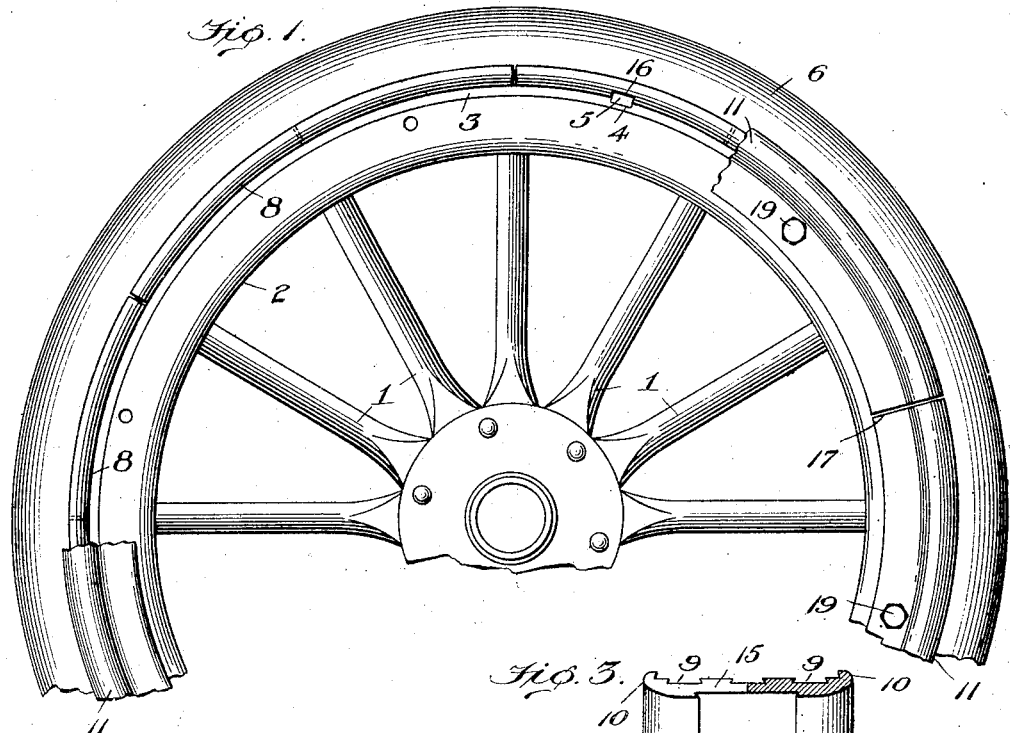
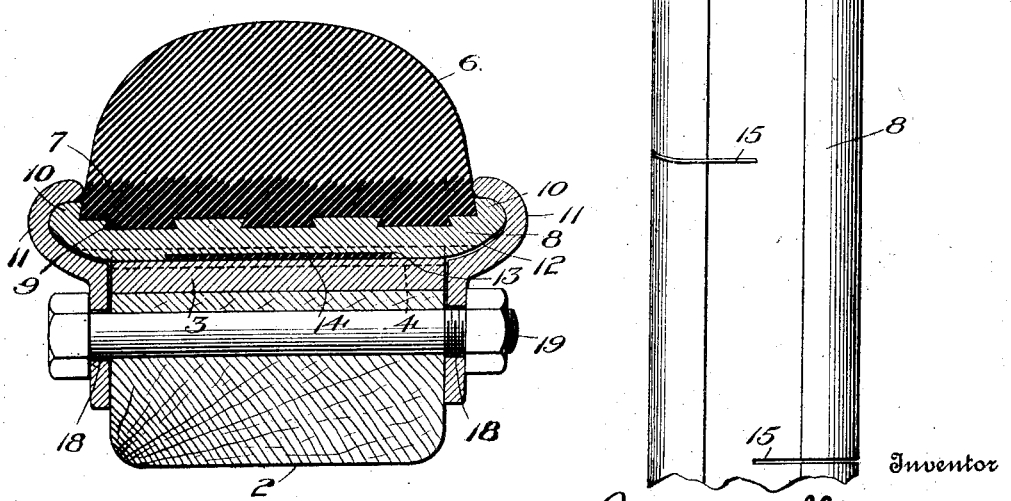
Witnesses
Edwin L. Bradford
N. S. Rohrer
Inventor
Wm. D. Morris,
By Wm. E. Dype.
Attorney

UNITED STATES PATENT OFFICE.

WILLIAM D. MORRIS, OF YOUNGSTOWN, OHIO, ASSIGNOR TO THE REPUBLIC RUBBER COMPANY, OF YOUNGSTOWN, OHIO, A CORPORATION OF OHIO.

VEHICLE-WHEEL.

1,072,348.  Specification of Letters Patent.  Patented Sept. 2, 1913.

Application filed July 17, 1912. Serial No. 709,961.

*To all whom it may concern:*

Be it known that I, WILLIAM D. MORRIS, a citizen of the United States, residing at Youngstown, in the county of Mahoning and State of Ohio, have invented certain new and useful Improvements in Vehicle-Wheels; and I do hereby declare the following to be a full, clear, and exact description of the invention, such as will enable others skilled in the art to which it appertains to make and use the same.

My invention relates to resilient tires for use upon vehicle wheels generally, but has reference more particularly to tires of the solid type for use upon trucks and other vehicles intended and adapted for heavy hauling.

It has for its object the production of resilient or cushion tires which are peculiarly durable in construction, efficient in operation, and readily mounted or demounted when occasion requires.

The invention will be hereinafter particularly described and pointed out in the claims following.

In the accompanying drawings which form part of this application and whereon corresponding numerals refer to like parts in the several views: Figure 1 is a view showing in side elevation a vehicle wheel having one side flange broken away exposing more plainly to view the present tire of novel construction. Fig. 2 is a transverse section through wheel felly and tire, and, Fig. 3 is a fragmentary view partly in perspective, showing an inverted plan of the steel tire-base.

Reference being had to the drawings and numerals thereon 1 indicates the spokes, and 2 the surrounding felly of a truck wheel. Encircling the felly 2 is a substantial metal band 3 shrunk or otherwise immovably secured in place by any well known means. At one point in its circumference the said band 3 is grooved transversely as shown at 4, Fig. 1, and in this groove is seated a key 5, preferably corresponding in length with the width of said band, but in any event projecting about one-half of its thickness above the surface thereof, as also shown by Fig. 1.

Upon the structure thus far described is mounted the tire which in the present instance is illustrated as a solid rubber structure 6 having a relatively hard rubber base 7 and a sub-base of steel 8 to which latter the rubber base 7 is secured by dovetailed connections 9 in the process of vulcanization. The opposite sides or clencher beads 10 of said steel sub-base 8 project laterally, as best shown by Fig. 2, and are curved to conform substantially with the coacting faces of removable tire retaining flanges 11, 11, except for a slight clearance 12 upon the inner surface of said beads or projections, the purposes of which will later appear. The said steel sub-base 8 is further characterized by a circumferential internal groove or channel 13 with dovetailed sides, into which relatively hard rubber is vulcanized as at 14, and thereby interposed between it and the periphery of the felly band 3 when the tire is properly mounted. This sub-base is also cut transversely from its extreme outer edges to its longitudinal center by slots 15 extending from opposite sides alternately, as clearly indicated by Fig. 3 of the drawings; and finally it is crossed transversely by a key seat 16 bisecting circumferential channel 13 at right angles, and adapted to receive the key 5 aforesaid when in register with the transverse groove 4 of band 3 hereinbefore mentioned.

The removable tire retaining flanges 11, 11 are of ordinary construction except for the fact that each is severed transversely as at 17 and their bolt holes 18 are slightly enlarged with relation to the bolts 19 employed, thus providing for slight expansion and contraction of the flanges, when drawn up and seated by agency of said bolts 19 in the ordinary and well understood manner.

This being a general description of my present invention, its use and operation are quite apparent, but the process of quickly mounting the tire upon the wheel structure for use may be briefly stated as follows: The nuts from all bolts 19 at one side having been removed, and likewise the adjacent retaining flange 11, key seat 16, crossing the inner periphery of steel base 8 is brought into register, approximately, with transverse groove 4 in the outer periphery of the felly band 3. The tire, including its attached steel base 8, is now forced laterally and bodily over the wheel band 3, very much as ordinary demountable tires are mounted, but it will be particularly noted that this operation in the present instance is greatly facilitated by the flexible or expansible and contractible character of steel base 8. As the mounting progresses the advance edge of said steel base expands automatically, while the following or trailing edge correspondingly contracts by virtue of the opening and closing of their respective transverse slots 15, the base 8 being thus flexed laterally out of the normal plane of the tire. This action not only renders the mounting a matter of small moment, even with extremely heavy truck tires, but also insures the great and material advantage of an unusually snug fit when mounted. This accomplished key 5 is driven into its seat between band 3 and base 8 where it serves to interlock the said parts and positively prevent the relative movement thereof, technically termed creeping. The removable tire retaining flange is next replaced and drawn firmly to its seat by action of bolts 19 in the self-evident manner, but it may be noted that, owing to the clearance 12 provided upon the inner circumference of each clencher beads or projection 10, both flanges 11 must of necessity engage first the outer circumference of said projections, thereby avoiding any tendency to lift the base 8 from its seat upon band 3. When thus mounted the entire structure is ready for service, and for the severe strains to which truck tires are usually subjected, and it will be noted that the annular hard rubber filler 14, located as shown in channel 13, prevents corrosion at this point of the surfaces which otherwise would be in direct contact throughout their entire width.

This being a description of my present invention in its preferred form of construction, I desire it understood that I do not limit myself to this particular embodiment of it, but claim the right to various changes of construction, alternate arrangement of parts, and modifications which may become apparent to persons skilled in the art to which this invention relates.

Having thus described my invention, what I claim and desire to secure by Letters Patent is:

1. In a vehicle wheel the combination with a supporting felly member, of an elastic tire having a relatively fixed metallic base slotted transversely and alternately from opposite sides to its longitudinal center, whereby said base may be expanded circumferentially in the operation of assembling and may be forced over the felly member to insure a snug fit.

2. In a vehicle wheel an elastic tire having a relatively fixed metallic base slotted transversely and alternately from opposite sides said slots terminating with their inner ends in substantial alinement.

3. In a vehicle wheel an elastic tire having a relatively fixed metallic base slotted transversely and alternately from opposite sides said slots terminating with their inner ends in substantial alinement in the median plane of the base.

4. In a vehicle wheel an elastic tire having a relatively fixed metallic base slotted alternately from opposite sides by a double series of transverse incisions collectively crossing but individually extending only part way across said base, the sum of the lengths of any two incisions taken from opposite sides being equal to the width of the base.

In testimony whereof I affix my signature, in presence of two subscribing witnesses.

WILLIAM D. MORRIS.

Witnesses:
J. M. MILLER,
G. PAUL FOULK.

Copies of this patent may be obtained for five cents each, by addressing the "Commissioner of Patents, Washington, D. C."